United States Patent
Nakamura et al.

(10) Patent No.: US 10,175,403 B2
(45) Date of Patent: Jan. 8, 2019

(54) OPTICAL MEMBER, POLARIZING PLATE SET, AND LIQUID CRYSTAL DISPLAY APPARATUS

(71) Applicant: NITTO DENKO CORPORATION, Ibaraki-shi, Osaka (JP)

(72) Inventors: Kozo Nakamura, Ibaraki (JP); Shouhei Maezawa, Ibaraki (JP); Takehito Fuchida, Ibaraki (JP); Hiroyuki Takemoto, Ibaraki (JP); Nao Murakami, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/427,078

(22) PCT Filed: May 7, 2014

(86) PCT No.: PCT/JP2014/062224
§ 371 (c)(1),
(2) Date: Mar. 10, 2015

(87) PCT Pub. No.: WO2014/188869
PCT Pub. Date: Nov. 27, 2014

(65) Prior Publication Data
US 2015/0234106 A1 Aug. 20, 2015

(30) Foreign Application Priority Data

May 20, 2013 (JP) ................................. 2013-106044

(51) Int. Cl.
*G02F 1/1335* (2006.01)
*G02B 5/30* (2006.01)
*G02B 5/04* (2006.01)

(52) U.S. Cl.
CPC ........... *G02B 5/3083* (2013.01); *G02B 5/045* (2013.01); *G02F 1/133536* (2013.01);
(Continued)

(58) Field of Classification Search
CPC ......... G02F 1/133536; G02F 1/133528; G02F 2001/133567; G02F 2001/133607;
(Continued)

(56) References Cited

U.S. PATENT DOCUMENTS 6,504,589 B1    1/2003  Kashima et al.
7,133,091 B2   11/2006  Ohsumi
(Continued)

FOREIGN PATENT DOCUMENTS

CN    1530713 A      9/2004
JP    10-293212 A    11/1998
(Continued)

OTHER PUBLICATIONS

CN102460285 downloaded from www.google.com on Aug. 14, 2016; translation from Chinese to English provided by Google Translate tool accessed on-site.*

(Continued)

*Primary Examiner* — Angela K Davison
(74) *Attorney, Agent, or Firm* — Westerman, Hattori, Daniels & Adrian, LLP

(57) ABSTRACT

There is provided an optical member that can realize a liquid crystal display apparatus that is excellent in mechanical strength and has high illuminance. An optical member according to an embodiment of the present invention includes a polarizing plate, a reflective polarizer, and a prism sheet in the stated order. The optical member has a reflectance of 70% or more for linearly polarized light having a wavelength of 650 nm entering the reflective polarizer at 45°.

12 Claims, 5 Drawing Sheets

(52) U.S. Cl.
CPC .................. *G02B 5/04* (2013.01); *G02B 5/30* (2013.01); *G02F 1/133528* (2013.01); *G02F 2001/133607* (2013.01)

(58) Field of Classification Search
CPC ........ G02B 5/3066; G02B 5/045; G02B 5/30; G02B 5/3041; G02B 5/04; G02B 6/0016; G02B 6/0025; G02B 2006/12114; G02B 5/303; G02B 2006/121143
USPC ............ 349/96; 359/485.01, 485.02, 485.03, 359/485.06
See application file for complete search history.

(56) References Cited

U.S. PATENT DOCUMENTS

| | | | |
|---|---|---|---|
| 7,349,039 B2 | 3/2008 | Lee et al. | |
| 2003/0095400 A1 | 5/2003 | Kashima et al. | |
| 2003/0156233 A1 | 8/2003 | Ohsumi | |
| 2005/0007513 A1* | 1/2005 | Lee | G02B 6/0053 349/57 |
| 2007/0058110 A1* | 3/2007 | Kajita | G02F 1/133533 349/96 |
| 2010/0315576 A1* | 12/2010 | Chung | G02F 1/133536 349/62 |
| 2012/0249935 A1* | 10/2012 | Oya | B32B 27/08 349/96 |
| 2013/0027634 A1* | 1/2013 | Saneto | G02F 1/133536 349/62 |
| 2014/0287211 A1 | 9/2014 | Oya et al. | |

FOREIGN PATENT DOCUMENTS

| | | |
|---|---|---|
| JP | 11-295714 A | 10/1999 |
| JP | 2004-272256 A | 9/2004 |
| JP | 2004-309618 A | 11/2004 |
| JP | 2007-79078 A | 3/2007 |
| JP | 2012-88613 A | 5/2012 |
| TW | 201106028 A | 2/2011 |
| TW | 201107837 A | 3/2011 |
| TW | 201302476 A | 1/2013 |
| TW | 201307964 A | 2/2013 |
| WO | 2013/057845 A1 | 4/2013 |
| WO | 2013/154125 A1 | 10/2013 |

OTHER PUBLICATIONS

International Search Report dated Aug. 12, 2014, issued in corresponding application No. PCT/JP2014/062224.

Office Action dated Aug. 27, 2015, issued in counterpart Taiwanese Patent Application No. 103117394, with English translation (5 pages).

Office Action dated Mar. 27, 2017, issued in counterpart Chinese Application No. 201480003095.0, with English translation. (15 pages).

Office Action dated Aug. 23, 2017, issued in counterpart Japanese Application No. 2013-106044, with English translation. (14 pages).

* cited by examiner

OPTICAL MEMBER, POLARIZING PLATE SET, AND LIQUID CRYSTAL DISPLAY APPARATUS

TECHNICAL FIELD

The present invention relates to an optical member, a polarizing plate set, and a liquid crystal display apparatus. More specifically, the present invention relates to an optical member including a polarizing plate, a reflective polarizer having a predetermined reflection characteristic, and a prism sheet, and a polarizing plate set and a liquid crystal display apparatus each using the optical member.

BACKGROUND ART

In recent years, as a display, a liquid crystal display apparatus using a surface light source device has been remarkably widespread. In a liquid crystal display apparatus including an edge light-type surface light source device, for example, light emitted from a light source enters a light guide plate, and propagates through an inside of the light guide plate while repeating a total reflection on a light output surface (liquid crystal cell-side surface) of the light guide plate and a back surface thereof. A part of the light that propagates through the inside of the light guide plate allows a traveling direction thereof to be changed by a light scattering body or the like, which is provided on the back surface of the light guide plate or the like, and is output from the light output surface to an outside of the light guide plate. Such light output from the light output surface of the light guide plate is diffused and condensed by various optical sheets such as a diffusion sheet, a prism sheet, a brightness enhancement film, or the like, and thereafter, the light enters a liquid crystal display panel in which polarizing plates are arranged on both sides of a liquid crystal cell. Liquid crystal molecules of a liquid crystal layer of the liquid crystal cell are driven for each of pixels to control transmission and absorption of the incident light. As a result, an image is displayed.

Typically, the above-mentioned prism sheet is fitted into a casing of the surface light source device, and is provided close to the light output surface of the light guide plate. In a liquid crystal display apparatus using such a surface light source device as described above, the prism sheet and the light guide plate are rubbed against each other when installing the prism sheet or under an actual usage environment, and the light guide plate is flawed in some cases. In order to solve such a problem, a technology for integrating the prism sheet with a light source-side polarizing plate is proposed (Patent Literature 1). However, in a liquid crystal display apparatus using such polarizing plate with which the prism sheet is integrated, further improvement for display characteristics is required.

CITATION LIST

Patent Literature

[PTL 1] JP 11-295714 A

SUMMARY OF INVENTION

Technical Problem

The present invention has been made to solve the above-mentioned problems, and an object of the present invention is to provide an optical member that can realize a liquid crystal display apparatus that is excellent in mechanical strength and has high illuminance.

Solution to Problem

An optical member according to an embodiment of the present invention includes a polarizing plate, a reflective polarizer, and a prism sheet in the stated order. The optical member has a reflectance of 70% or more for linearly polarized light having a wavelength of 650 nm entering the reflective polarizer at 45°.

In one embodiment of the present invention, the prism sheet includes an array of a plurality of columnar unit prisms that are convex toward a side opposite to the reflective polarizer.

In one embodiment of the present invention, a reflection axis direction of the reflective polarizer and a ridge line direction of each of the unit prisms of the prism sheet are parallel to each other. Alternatively, a reflection axis direction of the reflective polarizer and a ridge line direction of each of the unit prisms of the prism sheet are perpendicular to each other.

In one embodiment of the present invention, the optical member has a reflectance of 70% or more for linearly polarized light having a wavelength of 650 nm entering the reflective polarizer at 45°; and the optical member has a reflectance of 70% or more for each of linearly polarized lights having wavelengths of 450 nm and 550 nm entering the reflective polarizer at 45°.

In one embodiment of the present invention, the optical member has a reflectance of 80% or more for the linearly polarized light having a wavelength of 650 nm entering the reflective polarizer at 45°.

According to another aspect of the present invention, there is provided a polarizing plate set. The polarizing plate set includes the above-described optical member to be used as a back surface side polarizing plate; and a viewer side polarizing plate.

According to another aspect of the present invention, there is provided a liquid crystal display apparatus. The liquid crystal display apparatus includes a liquid crystal cell; a polarizing plate arranged on a viewer side of the liquid crystal cell; and the above-described optical member arranged on a side of the liquid crystal cell opposite to the viewer side.

Advantageous Effects of Invention

According to an embodiment of the present invention, in the optical member including the polarizing plate, the reflective polarizer, and the prism sheet, the reflection characteristic of the reflective polarizer in the predetermined direction is optimized. Thus, the optical member can realize a liquid crystal display apparatus having high illuminance. Further, the polarizing plate and the prism sheet are integrated, and hence the optical member according to an embodiment of the present invention can realize a liquid crystal display apparatus excellent in mechanical strength.

DESCRIPTION OF EMBODIMENTS

Hereinafter, preferred embodiments of the present invention are described with reference to the drawings. However, the present invention is not limited to these embodiments.

A. Entire Construction of Optical Member

Figure 1:
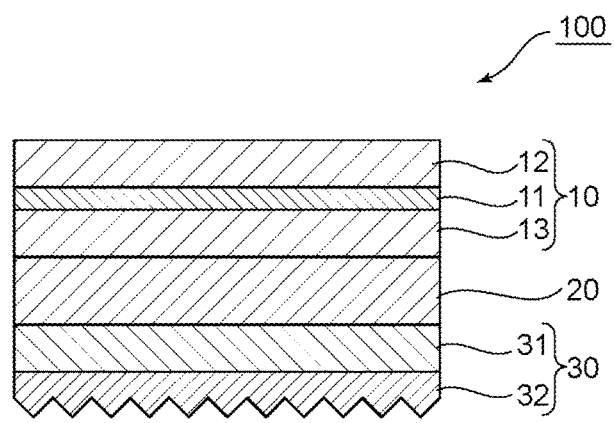
FIG. 1 is a schematic sectional view illustrating an optical member according to one embodiment of the present invention.

FIG. 1 is a schematic sectional view illustrating an optical member according to one embodiment of the present invention. An optical member 100 includes a polarizing plate 10, a reflective polarizer 20, and a prism sheet 30 in the stated order. The polarizing plate 10 typically includes a polarizer 11, a protective layer 12 arranged on one side of the polarizer 11, and a protective layer 13 arranged on the other side of the polarizer 11. The prism sheet 30 typically includes a base portion 31 and a prism portion 32. The polarizing plate and the prism sheet are integrated as described above, and hence an air layer between the prism sheet and the polarizing plate can be excluded, which can contribute to the thinning of a liquid crystal display apparatus. The thinning of the liquid crystal display apparatus has a high commercial value because the thinning widens the selection of design. Further, removing an air layer can suppress undesired reflection and refraction at an interface between the air layer and the prism sheet and/or the polarizing plate, and hence can prevent adverse effects on the display characteristics of the liquid crystal display apparatus. In addition, integrating the polarizing plate and the prism sheet can avoid a flaw in the prism sheet due to rubbing upon attachment of the prism sheet to a surface light source apparatus (a backlight unit or substantially a light guide plate). Accordingly, a liquid crystal display apparatus that can prevent the turbidity of its display resulting from such flaw and is excellent in mechanical strength can be obtained.

In an embodiment of the present invention, a reflectance for linearly polarized light having a wavelength of 650 nm entering the reflective polarizer at 45° is 70% or more. The reflectance is preferably 80% or more, more preferably 90% or more. The reflectance is preferably as high as possible and a theoretical upper limit therefor is 100%. Further, the reflectance for each of linearly polarized lights having wavelengths of 450 nm and 550 nm is also preferably high. The reflectance is preferably 80% or more, more preferably 90% or more. The reflectance is also preferably as high as possible and a theoretical upper limit therefor is 100%. In essence, a reflectance in the entire wavelength region of visible light is preferably high. With regard to the wavelength region and the reflectance, it is preferred that the reflectance in the wavelength region of 550 nm±50 nm be 70% or more, and it is more preferred that the reflectance in the wavelength region of 550 nm±100 nm be 70% or more.

One embodiment of the present invention has been made to solve the following problem newly found in the optical member obtained by integrating the polarizing plate, the reflective polarizer, and the prism sheet: the illuminance of the liquid crystal display apparatus reduces as compared with that in the case where the polarizing plate and the prism sheet are used while being separately arranged. Optimizing the reflection characteristic of the reflective polarizer in a predetermined direction as described above can suppress the reduction in illuminance of the liquid crystal display apparatus as a problem peculiar to the polarizing plate integrated with the prism sheet and the reflective polarizer. The technical significance of the optimization of the reflectance at an angle of incidence of 45° is as described below. In a conventional construction in which the polarizing plate and the prism sheet are used while being separately arranged, the refraction of light occurs in accordance with Snell's law and hence only light having an angle of incidence of less than 40° enters the reflective polarizer. However, when the polarizing plate, the reflective polarizer, and the prism sheet are integrated with one another, light having an angle of incidence of from 40° to 50° enters the reflective polarizer. Optical analysis simulation estimates that exiting light in the range accounts for about 15% of the entire light. Of the exited light, light that is not reflected by the reflective polarizer does not contribute to the illuminance, which results in an optical loss. In view of the foregoing, optimizing the reflectance at 45° as the center of the range of the light that exits owing to the integration with the prism sheet enables effective utilization of even the 15% of the light, and hence can suppress the reduction in illuminance. In addition, the technical significance of the optimization of the reflectance for light having a wavelength of 650 nm is as described below. In essence, the reflectance is desirably high in the entire visible region. However, as the angle of incidence of light becomes more oblique, an optical path length shifts to change a condition under which reflection occurs, and hence a reflection band shifts to shorter wavelengths. As a result, light on a blue color side is reflected but light on a red color side is hardly reflected. Therefore, optimizing the reflectance for the light having a wavelength of 650 nm as the light on the red color side enables efficient reflection of the light over the entire visible region. As a result, the utilization efficiency of the light in the case of the integration with the prism sheet improves and hence the illuminance improves.

The components of the optical member are hereinafter described in detail.

B. Polarizing Plate

The polarizing plate 10 typically includes the polarizer 11, the protective layer 12 arranged on one side of the polarizer 11, and the protective layer 13 arranged on the other side of the polarizer 11. The polarizer is typically an absorption-type polarizer.

B-1. Polarizer

The transmittance of the above-mentioned absorption-type polarizer (also referred to as a single axis transmittance) at the wavelength of 589 nm is preferably 41% or more, more preferably 42% or more. Note that, the theoretical upper limit of the single axis transmittance is 50%. In addition, polarization degree thereof is preferably from 99.5% to 100%, more preferably from 99.9% to 100%. As long as the single axis transmittance and the polarization degree fall within the range, contrast in the front direction can be further higher when used in the liquid crystal display apparatus.

The single axis transmittance and polarization degree described above can be measured with a spectrophotometer. A specific measurement method for the polarization degree may involve measuring parallel transmittance ($H_0$) and perpendicular transmittance ($H_{90}$) of the polarizer, and determining the polarization degree through the following expression: polarization degree (%)=$\{(H_0-H_{90})/(H_0+H_{90})\}^{1/2} \times 100$. The parallel transmittance ($H_0$) refers to a value of transmittance of a parallel-type laminated polarizer prepared by causing two identical polarizers to overlap with each other in such a manner that absorption axes thereof are parallel to each other. In addition, the perpendicular transmittance ($H_{90}$) refers to a value of a transmittance of a perpendicular-type laminated polarizer prepared by causing two identical polarizers to overlap with each other in such a manner that absorption axes thereof are perpendicular to each other. Note that, each transmittance is a Y value obtained through relative spectral responsivity correction at a two-degree field of view (C light source) in JIS Z 8701-1982.

Any appropriate polarizer may be adopted as the absorption-type polarizer depending on purpose. Examples thereof include a polarizer obtained by causing a hydrophilic polymer film such as a polyvinyl alcohol-based film, a partially formalized polyvinyl alcohol-based film, or an ethylene-vinyl acetate copolymer-based partially saponified film to absorb a dichroic substance such as iodine or a dichroic dyestuff, followed by uniaxial stretching, and a polyene-based alignment film such as a product obtained by subjecting polyvinyl alcohol to dehydration treatment or a product obtained by subjecting polyvinyl chloride to dehydrochlorination treatment. In addition, there may also be used, for example, guest-host-type E-type and O-type polarizers each including a dichroic substance and a liquid crystalline compound in which the liquid crystalline compound is aligned in a fixed direction as disclosed in, for example, U.S. Pat. No. 5,523,863, and E-type and O-type polarizers in which the lyotropic liquid crystals are aligned in a fixed direction as disclosed in, for example, U.S. Pat. No. 6,049,428.

Of such polarizers, a polarizer formed of a polyvinyl alcohol (PVA)-based film containing iodine is suitably used from the viewpoint of having a high polarization degree. The polyvinyl alcohol or a derivative thereof is used as a material for the polyvinyl alcohol-based film to be applied to the polarizer. Examples of the derivative of polyvinyl alcohol include polyvinyl formal and polyvinyl acetal as well as polyvinyl alcohol modified with, for example, an olefin such as ethylene or propylene, an unsaturated carboxylic acid such as acrylic acid, methacrylic acid, or crotonic acid, alkyl ester thereof, or acrylamide. Polyvinyl alcohol having a polymerization degree of about from 1,000 to 10,000 and a saponification degree of about from 80 mol % to 100 mol % are generally used.

The polyvinyl alcohol-based film (unstretched film) is subjected to at least uniaxial stretching treatment and iodine dyeing treatment according to conventional methods, and may further be subjected to boric acid treatment or iodine ion treatment. In addition, the polyvinyl alcohol-based film (stretched film) subjected to the treatment described above becomes a polarizer through drying according to a conventional method.

The stretching method in the uniaxial stretching treatment is not particularly limited, and any one of a wet stretching method and a dry stretching method may be adopted. As a stretching means for the dry stretching method, there is given, for example, a roll stretching method, a heating roll stretching method, or a compression stretching method. The stretching may be performed in a plurality of steps. In the stretching means, the unstretched film is generally in a heated state. A film having a thickness of about from 30 μm to 150 μm is generally used as the unstretched film. The stretching ratio of the stretched film may be appropriately set depending on purpose. However, the stretching ratio (total stretching ratio) is about from 2 times to 8 times, preferably from 3 times to 6.5 times, more preferably from 3.5 times to 6 times. The thickness of the stretched film is suitably about from 5 μm to 40 μm.

The iodine dyeing treatment is performed by immersing the polyvinyl alcohol-based film in an iodine solution containing iodine and potassium iodide. The iodine solution is generally an iodine aqueous solution, and contains iodine and potassium iodide as a dissolution aid. The concentration of iodine is preferably about from 0.01 wt % to 1 wt %, more preferably from 0.02 wt % to 0.5 wt %, and the concentration of potassium iodide is preferably about from 0.01 wt % to 10 wt %, more preferably from 0.02 wt % to 8 wt %.

In iodine dyeing treatment, the temperature of the iodine solution is generally about from 20° C. to 50° C., and is preferably from 25° C. to 40° C. Time period of the immersion falls within a range of generally about from 10 seconds to 300 seconds, and is preferably from 20 seconds to 240 seconds. In iodine dyeing treatment, through adjustment of conditions such as the concentration of the iodine solution, and the immersion temperature and time period of the immersion of polyvinyl alcohol-based film into the iodine solution, iodine content and potassium content in the polyvinyl alcohol-based film is adjusted so as to allow both to fall within a desires range. The iodine dyeing treatment may be performed at any one of the time points before the uniaxial stretching treatment, during the uniaxial stretching treatment, and after the uniaxial stretching treatment.

The boric acid treatment is performed by immersing the polyvinyl alcohol-based film in a boric acid aqueous solution. The concentration of boric acid in the boric acid aqueous solution is about from 2 wt % to 15 wt %, preferably from 3 wt % to 10 wt %. Potassium iodide, potassium ion and iodine ion may be incorporated in the boric acid aqueous solution. The concentration of potassium iodide in the boric acid aqueous solution is about from 0.5 wt % to 10 wt %, and is preferably from 1 wt % to 8 wt %. A polarizer with low coloration, that is, almost constant absorbance over approximately entire wavelength region of visible light, so-called neutral grey can be obtained with a boric acid aqueous solution containing potassium iodide.

For example, an aqueous solution obtained by incorporating iodine ion with, for example, potassium iodide is used for the iodine ion treatment. The concentration of potassium iodide is preferably about from 0.5 wt % to 10 wt %, more preferably from 1 wt % to 8 wt %. In iodine ion immersion treatment, the temperature of the aqueous solution is generally about from 15° C. to 60° C., and is preferably from 25° C. to 40° C. Time period of the immersion is generally about from 1 second to 120 seconds, and preferably falls within a range of from 3 seconds to 90 seconds. The time point of the iodine ion treatment is not particularly limited as long as the time point is before the drying step. The treatment may be performed after water washing described later.

The polyvinyl alcohol-based film (stretched film) subjected to the treatment described above may be subjected to a water washing step and a drying step according to a conventional method.

Any appropriate drying method such as natural drying, drying by blowing, or drying by heating may be adopted as the drying step. In the case of the drying by heating, for example, drying temperature thereof is typically from 20° C. to 80° C., and is preferably from 25° C. to 70° C. Time period of the drying is preferably about from 1 minute to 10 minutes. In addition, the moisture content of the polarizer after the drying is preferably from 10 wt % to 30 wt %, more preferably from 12 wt % to 28 wt %, still more preferably from 16 wt % to 25 wt %. When the moisture content is excessively high, in drying the polarizing plate, the polarization degree is liable to decrease in accordance with the drying of the polarizer. In particular, the perpendicular transmittance in a short wavelength region of 500 nm or less is increased, that is, the black display is liable to be colored with blue because of the leakage of the short wavelength light. On the contrary, when the moisture content of the polarizer is excessively small, a problem such as local uneven defect (knick defect) may easily occur.

The polarizing plate 10 is typically provided in a long shape (e.g., a roll shape) and used in the production of an optical member. In one embodiment, the polarizer has an absorption axis in its lengthwise direction. Such polarizer can be obtained by a production method that has been conventionally employed in the industry (e.g., such production method as described above). In another embodiment, the polarizer has the absorption axis in its widthwise direction. The optical member of the present invention can be produced by laminating such polarizer together with a reflective polarizer of a linearly polarized light separation type having a reflection axis in its widthwise direction according to the so-called roll-to-roll process, and hence the efficiency of the production can be significantly improved.

B-2. Protective Layer

The protective layer is formed of any appropriate film that may be used as a protective film for the polarizer. Specific examples of a material serving as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof is a thermosetting resin or a UV-curable resin such as a (meth)acrylic resin, a urethane-based resin, a (meth)acrylic urethane-based resin, an epoxy-based resin, or a silicone-based resin. Still another example thereof is a glassy polymer such as a siloxane-based polymer. Further, a polymer film described in JP 2001-343529 A (WO 01/37007 A1) may also be used. As a material for the film, for example, there may be used a resin composition containing a thermoplastic resin having a substituted or unsubstituted imide group in a side chain and a thermoplastic resin having a substituted or unsubstituted phenyl group and a nitrile group in a side chain. An example thereof is a resin composition containing an alternate copolymer formed of isobutene and N-methylmaleimide and an acrylonitrile-styrene copolymer. The polymer film may be an extruded product of the resin composition, for example. The protective layers may be identical to or different from each other.

The thickness of each of the protective layers is preferably from 10 µm to 100 µm. Each of the protective layers may be laminated on the polarizer through an adhesion layer (specifically an adhesive layer or a pressure-sensitive adhesive layer), or may be laminated so as to be in close contact with the polarizer (without through the adhesion layer). The adhesive layer is formed of any appropriate adhesive. The adhesive is, for example, a water-soluble adhesive using a polyvinyl alcohol-based resin as a main component. The water-soluble adhesive using the polyvinyl alcohol-based resin as a main component can preferably further contain a metal compound colloid. The metal compound colloid can be such that metal compound fine particles are dispersed in a dispersion medium, and the colloid can be a colloid that electrostatically stabilizes as a result of interactive repulsion between the charges of the same kind of the fine particles to permanently have stability. The average particle diameter of the fine particles forming the metal compound colloid can be any appropriate value as long as the average particle diameter does not adversely affect the optical characteristics of the polarizer such as a polarization characteristic. The average particle diameter is preferably from 1 nm to 100 nm, more preferably from 1 nm to 50 nm. This is because the fine particles can be uniformly dispersed in the adhesive layer, its adhesion can be secured, and a knick can be suppressed. It should be noted that the term "knick" refers to a local uneven defect that occurs at an interface between the polarizer and each of the protective layers.

C. Reflective Polarizer

The reflective polarizer 20 has a function of transmitting polarized light in a specific polarized state (polarization direction) and reflecting light in a polarized state other than the foregoing. The reflective polarizer 20 may be of a linearly polarized light separation type or may be of a circularly polarized light separation type. Hereinafter, description is given by taking the reflective polarizer of the linearly polarized light separation type as an example. It should be noted that the reflective polarizer of the circularly polarized light separation type is, for example, a laminate of a film obtained by fixing a cholesteric liquid crystal and a λ/4 plate.

Figure 2:
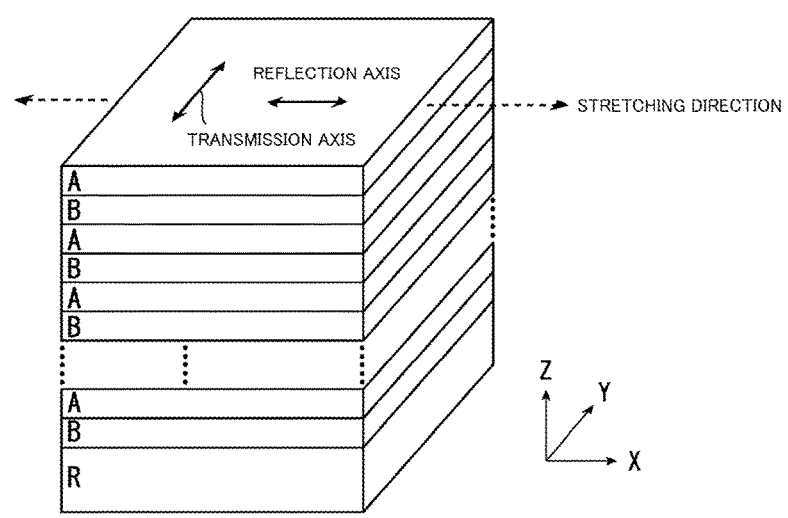
FIG. 2 is a schematic perspective view of an example of a reflective polarizer that can be used in the optical member of the present invention.

FIG. 2 is a schematic perspective view of an example of a reflective polarizer. The reflective polarizer is a multilayer laminate obtained by alternately laminating a layer A having birefringence and a layer B substantially free of birefringence. For example, the total number of the layers of such multilayer laminate can be from 50 to 1,000. In the illustrated example, a refractive index nx in the x-axis direction of the A layer is larger than a refractive index ny in the y-axis direction thereof, and a refractive index nx in the x-axis direction of the B layer and a refractive index ny in the y-axis direction thereof are substantially equal to each other. Therefore, a refractive index difference between the A layer and the B layer is large in the x-axis direction, and is substantially zero in the y-axis direction. As a result, the x-axis direction serves as a reflection axis and the y-axis direction serves as a transmission axis. The refractive index difference between the A layer and the B layer in the x-axis direction is preferably from 0.2 to 0.3. It should be noted that the x-axis direction corresponds to the stretching direction of the reflective polarizer in a production method to be described later.

The A layer is preferably formed of a material that expresses birefringence when stretched. Typical examples of such material include naphthalene dicarboxylic acid polyester (such as polyethylene naphthalate), polycarbonate, and an acrylic resin (such as polymethyl methacrylate). Of those, the polyethylene naphthalate is preferred. The B layer is preferably formed of a material that is substantially free of expressing birefringence even when stretched. Such material is typically, for example, the copolyester of naphthalene dicarboxylic acid and terephthalic acid.

The reflective polarizer transmits light having a first polarization direction (such as a p-wave) and reflects light having a second polarization direction perpendicular to the first polarization direction (such as an s-wave) at an interface between the A layer and the B layer. Part of the reflected light passes as light having the first polarization direction through the interface between the A layer and the B layer, and the other part thereof is reflected as light having the second polarization direction at the interface. Such reflection and transmission are repeated many times in the reflective polarizer, and hence the utilization efficiency of light can be improved.

In one embodiment, the reflective polarizer may include a reflective layer R as the outermost layer on a side opposite to the polarizing plate 10 as illustrated in FIG. 2. Light that has finally returned to the outermost portion of the reflective polarizer without being utilized can be additionally utilized by providing the reflective layer R, and hence the utilization efficiency of the light can be additionally improved. The reflective layer R typically expresses a reflecting function by virtue of the multilayer structure of a polyester resin layer.

The total thickness of the reflective polarizer can be appropriately set depending on, for example, purposes and the total number of the layers in the reflective polarizer. The total thickness of the reflective polarizer is preferably from 10 μm to 150 μm. When the total thickness falls within such range, a liquid crystal display apparatus that suppresses the occurrence of the moire and has high brightness can be realized.

In one embodiment, in the optical member 100, the reflective polarizer 20 is arranged so as to transmit light having a polarization direction parallel to the transmission axis of the polarizing plate 10. That is, the reflective polarizer 20 is arranged so that its transmission axis may be in a direction approximately parallel to the direction of the transmission axis of the polarizing plate 10. With such construction, light to be absorbed by the polarizing plate 10 can be recycled, the utilization efficiency can be additionally improved, and the brightness can be improved.

The reflective polarizer can be typically produced by combining co-extrusion and lateral stretching. The co-extrusion can be performed by any appropriate system. For example, the system may be a feed block system or may be a multi-manifold system. For example, a material constituting the A layer and a material constituting the B layer are extruded in a feed block, and are then formed into a plurality of layers with a multiplier. It should be noted that such apparatus for forming the materials into a plurality of layers is known to one skilled in the art. Next, the resultant long multilayer laminate is typically stretched in a direction (TD) perpendicular to its conveying direction. The material constituting the A layer (such as polyethylene naphthalate) is increased in refractive index only in the stretching direction by the lateral stretching, and as a result, expresses birefringence. The material constituting the B layer (such as the copolyester of naphthalene dicarboxylic acid and terephthalic acid) is not increased in refractive index in any direction even by the lateral stretching. As a result, a reflective polarizer having a reflection axis in the stretching direction (TD) and having a transmission axis in the conveying direction (MD) can be obtained (the TD corresponds to the x-axis direction of FIG. 2 and the MD corresponds to the y-axis direction thereof). It should be noted that a stretching operation can be performed with any appropriate apparatus.

The desired reflectance can be realized by appropriately setting, for example, a constituent material for each layer of the reflective polarizer, a difference in refractive index between its layers, the birefringence of each layer, the thickness of each layer, and the total number of the layers.

Another example of the linearly polarized light separation-type reflective polarizer is such a polarizing fiber or polarizing woven fabric as described in JP 2009-24318 A. The performance of the reflective polarizer becomes better as a difference in refractive index in a direction perpendicular to a lengthwise direction between polarizing fibers reduces and a difference in refractive index in the lengthwise direction between the polarizing fibers increases. Still another example of the linearly polarized light separation-type reflective polarizer is such a wire grid polarizer as described in JP 2011-48630 A.

For example, a reflective polarizer described in JP 09-507308 A may be used as the reflective polarizer. In addition, as the reflective polarizer, a commercial product may be used as it is, or a commercial product may be subjected to secondary processing (such as stretching) and used. Examples of the commercial product include a trade name DBEF manufactured by 3M and a trade name APF manufactured by 3M. In addition, an example of the wire grid polarizer is a trade name WGF™ manufactured by Asahi Kasei E-materials Corporation.

The reflective polarizer 20 is bonded on to the polarizing plate 10 through any appropriate adhesion layer (such as an adhesive layer or a pressure-sensitive adhesive layer: not shown).

D. Prism Sheet

The prism sheet 30 is arranged on the side of the reflective polarizer 20 opposite to the polarizing plate 10. The prism sheet 30 typically includes the base portion 31 and the prism portion 32. It should be noted that in this embodiment, the base portion 31 is not necessarily needed to be provided because the reflective polarizer 20 can function as a base portion for supporting the prism portion 32. When the optical member according to an embodiment of the present invention is arranged on the backlight side of a liquid crystal display apparatus, the prism sheet 30 guides polarized light, which has been emitted from the light guide plate of the backlight unit of the apparatus, as polarized light having the maximum intensity in an approximately normal direction of the liquid crystal display apparatus to the polarizing plate 10 through the reflective polarizer 20 by means of, for example, total reflection in the prism portion 32 while maintaining the polarized state of the light. It should be noted that the term "approximately normal direction" comprehends a direction at a predetermined angle with respect to a normal direction, e.g., a direction at an angle in the range of ±10° with respect to the normal direction.

The prism sheet 30 is bonded onto the reflective polarizer 20 through any appropriate adhesion layer (such as an adhesive layer or a pressure-sensitive adhesive layer: not shown).

D-1. Prism Portion

Figure 3:
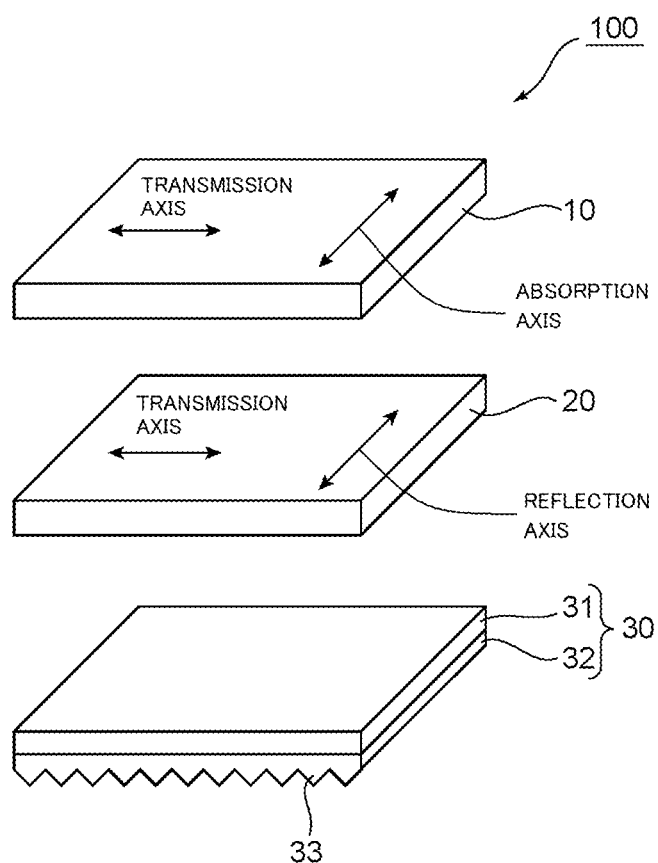
FIG. 3 is an exploded perspective view of the optical member of FIG. 1.

In one embodiment, as illustrated in each of FIGS. 1 and 3, the prism sheet 30 (substantially the prism portion 32) includes an array of a plurality of unit prisms 33, which are convex toward a side opposite to the reflective polarizer 20, in a parallel manner. Each of the unit prisms 33 is preferably columnar. The lengthwise direction (ridge line direction) of each of the unit prisms 33 is directed toward a direction approximately perpendicular or approximately parallel to the transmission axis of the polarizing plate 10 and the transmission axis of the reflective polarizer 20. As illustrated in FIG. 3, the lengthwise direction (ridge line direction) of each of the unit prisms 33 is preferably directed toward a direction approximately perpendicular to the transmission axis of the polarizing plate 10 and the transmission axis of the reflective polarizer 20 (therefore, a direction approximately parallel to the reflection axis of the reflective polarizer 20). When the prism sheet and the reflective polarizer are arranged so that the ridge line direction of each unit prism may be approximately parallel to the reflection axis of the reflective polarizer, the reduction in illuminance of the liquid crystal display apparatus can be suppressed in an additionally satisfactory manner by a synergistic effect with the optimization of the reflectance of the reflective polarizer in the predetermined direction. It should be noted that, in this description, the expressions "substantially perpendicular" and "approximately perpendicular" include a case where an angle formed by two directions is 90°±10°, preferably 90°±7°, more preferably 90°±5°. The expressions "substantially parallel" and "approximately parallel" include a case where an angle formed by two directions is 0°±10°, preferably 0°±7°, more preferably 0°±5°. Moreover, in this description, such a simple expression "perpendicular" or "parallel" can include a substantially perpendicular state or a substantially parallel state. It should be noted that the prism sheet 30 may be arranged so that the ridge line direction of each of the unit prisms 33, and each of the transmission axis of the polarizing plate 10 and the transmission axis of the reflective polarizer 20 may form a predetermined angle (the so-called oblique arrangement). The adoption of such construction can prevent the occurrence of the moire in an additionally satisfactory manner in some cases. It should be noted that even the case where the oblique arrangement is intentionally performed is often included in the category "substantially parallel" because the angle is often at most about 10°.

Any appropriate construction can be adopted as the shape of each of the unit prisms 33 as long as the effects of the present invention are obtained. The shape of a section of each of the unit prisms 33 parallel to its arrangement direction and parallel to its thickness direction may be a triangular shape or may be any other shape (e.g., such a shape that one of, or each of both, the inclined planes of a triangle has a plurality of flat surfaces having different tilt angles). The triangular shape may be a shape asymmetric with respect to a straight line passing the apex of the unit prism and perpendicular to the surface of the sheet (e.g., a scalene triangle), or may be a shape symmetric with respect to the straight line (e.g., an isosceles triangle). Further, the apex of the unit prism may be of a chamfered curved surface shape, or may be of a shape whose section is a trapezoid, the shape being obtained by such cutting that its tip becomes a flat surface. Detailed shapes of the unit prisms 33 can be appropriately set depending on purposes. For example, a construction described in JP 11-84111 A can be adopted for each of the unit prisms 33.

D-2. Base Portion

When the prism sheet 30 is provided with the base portion 31, the base portion 31 and the prism portion 32 may be integrally formed by, for example, subjecting a single material to extrusion, or the prism portion may be shaped on a film for the base portion. The thickness of the base portion is preferably from 25 µm to 150 µm. With such thickness, the distance between the light diffusion layer and the prism portion can be caused to fall within the desired range. Further, such thickness is preferred from the viewpoints of the handling property and strength of the prism sheet.

Any appropriate material can be adopted as a material constituting the base portion 31 depending on purposes and the construction of the prism sheet. When the prism portion is shaped on the film for the base portion, the film for the base portion is specifically, for example, a film formed of cellulose triacetate (TAC), a (meth)acrylic resin such as polymethyl methacrylate (PMMA), or a polycarbonate (PC) resin. The film is preferably an unstretched film.

When the base portion 31 and the prism portion 32 are integrally formed of a single material, the same material as a material for forming the prism portion when the prism portion is shaped on the film for the base portion can be used as the material. Examples of the material for forming the prism portion include epoxy acrylate- and urethane acrylate-based reactive resins (such as an ionizing radiation-curable resin). When the prism sheet of an integral construction is formed, a polyester resin such as PC or PET, an acrylic resin such as PMMA or MS, or an optically transparent thermoplastic resin such as cyclic polyolefin can be used.

It is preferred that the base portion 31 substantially have optical isotropy. The phrase "substantially have optical isotropy" as used herein means that a retardation value is so small as to have substantially no influences on the optical characteristics of the liquid crystal display apparatus. For example, an in-plane retardation Re of the base portion is preferably 20 nm or less, more preferably 10 nm or less. It should be noted that the in-plane retardation Re is an in-plane retardation value measured at 23° C. with light having a wavelength of 590 nm. The in-plane retardation Re is represented by the equation "Re=(nx−ny)×d." Here, nx represents a refractive index in the direction in which a refractive index becomes maximum in the plane of the optical member (i.e., a slow axis direction), ny represents a refractive index in a direction perpendicular to the slow axis in the plane (i.e., a fast axis direction), and d represents the thickness (nm) of the optical member.

Further, the photoelastic coefficient of the base portion 31 is preferably from $-10\times10^{-12}$ m$^2$/N to $10\times10$-$12^{-12}$ m$^2$/N, more preferably from $-5\times10^{-12}$ m$^2$/N to $5\times10^{-12}$ m$^2$/N, still more preferably from $-3\times10^{-12}$ m$^2$/N to $3\times10$-$12$ m$^2$/N.

E. Retardation Layer

The optical member 100 may further have any appropriate retardation layer at any appropriate position depending on purposes (not shown). The positions at which retardation layers are arranged, the number of the layers, the birefringence (refractive index ellipsoid) of each of the layers, and the like can be appropriately selected depending on, for example, the drive mode of a liquid crystal cell and desired characteristics. The retardation layer may also serve as a protective layer for a polarizer depending on purposes. Hereinafter, a typical example of the retardation layer applicable to the optical member of the present invention is described.

For example, in the case where the optical member is used in a liquid crystal display apparatus of an IPS mode, the optical member may have a first retardation layer, which satisfies a relationship of $nx_1>ny_1>nz_1$, on the side of the polarizing plate 10 opposite to the reflective polarizer 20. In this case, the optical member may further have a second retardation layer, which satisfies a relationship of $nz_2>nx_2>ny_2$, outside the first retardation layer (on a side opposite to the polarizing plate 10). The second retardation layer may be the so-called positive C-plate that satisfies a relationship of $nz_2>nx_2=ny_2$. The slow axis of the first retardation layer and the slow axis of the second retardation layer may be perpendicular or parallel to each other. The axes are preferably parallel to each other in consideration of the viewing angle and productivity of the optical member.

An in-plane retardation $Re_1$ of the first retardation layer is preferably from 60 nm to 140 nm. An Nz coefficient $Nz_1$ of the first retardation layer is preferably from 1.1 to 1.7. An in-plane retardation $Re_2$ of the second retardation layer is preferably from 10 nm to 70 nm. A thickness direction retardation $Rth_2$ of the second retardation layer is preferably from −120 nm to −40 nm. The in-plane retardations Re are as defined in the foregoing. The thickness direction retardation Rth is represented by the equation "Rth={(nx+ny)/2−nz}×d." The Nz coefficient is represented by the equation "Nz=(nx−nz)/(nx−ny)." Here, nx and ny are as defined in the foregoing. nz represents a refractive index in the thickness direction of the optical member (here, the first retardation layer or the second retardation layer). It should be noted that the suffixes "1" and "2" represent the first retardation layer and the second retardation layer, respectively.

Alternatively, the first retardation layer may be a retardation layer that satisfies a relationship of $nx_1>nz_1>ny_1$. In this case, the second retardation layer is preferably the so-called negative C-plate that satisfies a relationship of $nx_2=ny_2>nz_2$. It should be noted that for example, the expression "nx=ny" as used herein comprehends not only the case where nx and ny are strictly equal to each other but also the case where nx and ny are substantially equal to each other. The purport of the phrase "substantially equal" as used herein is that the following case is also comprehended: the case where nx and ny are different from each other to the extent that the difference has no influences on the entire optical characteristics of the liquid crystal display apparatus in practical use. Therefore, the negative C-plate in this embodiment comprehends the case where the plate has biaxiality.

In addition, for example, in the case where the optical member is used in a liquid crystal display apparatus of a VA mode, the optical member may be used as a circularly polarizing plate. Specifically, the optical member may have the first retardation layer that functions as a λ/4 plate on the side of the polarizing plate 10 opposite to the reflective polarizer 20. In this case, an angle formed between the absorption axis of the polarizer and the slow axis of the first retardation layer is preferably substantially 45° or substantially 135°. Further, in this case, the liquid crystal display apparatus preferably includes a retardation layer that functions as a λ/4 plate between its liquid crystal cell and viewer side polarizing plate. The optical member may further have the second retardation layer, which satisfies a relationship of $nz_2>nx_2>ny_2$, between the polarizer and the first retardation layer. Further, when the retardation wavelength dispersion value ($Re_{cell}[450]/Re_{cell}[550]$) of the liquid crystal cell is represented by $\alpha_{cell}$ and the retardation wavelength dispersion value ($Re_1[450]/Re_1[550]$) of the first retardation layer is represented by $\alpha_1$, the ratio $\alpha_1/\alpha_{cell}$ is preferably from 0.95 to 1.02. In addition, the Nz coefficient of the first retardation layer preferably satisfies a relationship of $1.1<Nz_1\leq2.4$, and the Nz coefficient of the second retardation layer preferably satisfies a relationship of $-2\leq Nz_2\leq-0.1$.

In addition, for example, when the optical member is used in the liquid crystal display apparatus of the VA mode, the optical member may be used as a linearly polarizing plate. Specifically, the optical member may have the first retardation layer, which satisfies a relationship of $nx_1>ny_1>nz_1$, on the side of the polarizing plate 10 opposite to the reflective polarizer 20. The in-plane retardation $Re_1$ of the first retardation layer is preferably from 20 nm to 200 nm, more preferably from 30 nm to 150 nm, still more preferably from 40 nm to 100 nm. A thickness direction retardation $Rth_1$ of the first retardation layer is preferably from 100 nm to 800 nm, more preferably from 100 nm to 500 nm, still more preferably from 150 nm to 300 nm. The Nz coefficient of the first retardation layer is preferably from 1.3 to 8.0.

F. Polarizing Plate Set

The optical member of the present invention can be typically used as a polarizing plate arranged on the side of a liquid crystal display apparatus opposite to its viewer side (hereinafter sometimes referred to as "back surface side polarizing plate"). In this case, a polarizing plate set including the back surface side polarizing plate and a viewer side polarizing plate can be provided. Any appropriate polarizing plate can be adopted as the viewer side polarizing plate. The viewer side polarizing plate typically includes a polarizer (such as an absorption-type polarizer) and a protective layer arranged on at least one side of the polarizer. Those described in the section B can be used as the polarizer and the protective layer. The viewer side polarizing plate may further have any appropriate optical functional layer (such as a retardation layer, a hard coat layer, an antiglare layer, or an antireflection layer) depending on purposes. The polarizing plate set is arranged on each side of a liquid crystal cell so that the absorption axis of (the polarizer of) the viewer side polarizing plate and the absorption axis of (the polarizer of) the back surface side polarizing plate may be substantially perpendicular or parallel to each other.

G. Liquid Crystal Display Apparatus

Figure 4:
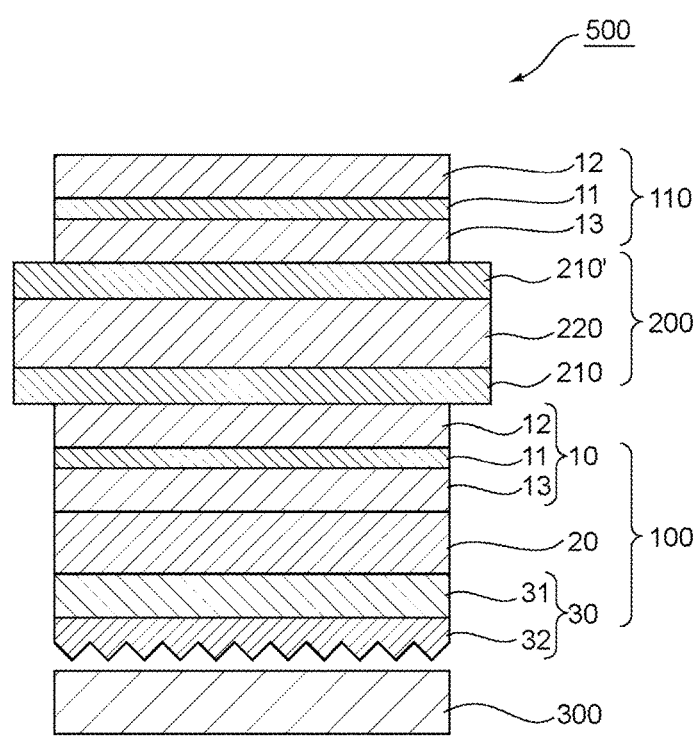
FIG. 4 is a schematic sectional view illustrating a liquid crystal display apparatus according to one embodiment of the present invention.

FIG. 4 is a schematic sectional view of a liquid crystal display apparatus according to one embodiment of the present invention. A liquid crystal display apparatus 500 includes a liquid crystal cell 200, a viewer side polarizing plate 110 arranged on the viewer side of the liquid crystal cell 200, the optical member 100 of the present invention as a back surface side polarizing plate arranged on the side of the liquid crystal cell 200 opposite to the viewer side, and a backlight unit 300 arranged on the side of the optical member 100 opposite to the liquid crystal cell 200. The optical member 100 is as described in the sections A to F. The viewer side polarizing plate is as described in the section G. In the illustrated example, the viewer side polarizing plate 110 includes the polarizer 11, the protective layer 12 arranged on one side of the polarizer, and the protective layer 13 arranged on the other side of the polarizer 11. The viewer side polarizing plate 110 and the optical member (back surface side polarizing plate) 100 are arranged so that their respective absorption axes may be substantially perpendicular or parallel to each other. Any appropriate construction can be adopted for the backlight unit 300. For example, the backlight unit 300 may be of an edge light system or may be of a direct system. When the direct system is adopted, the backlight unit 300 includes, for example, a light source, a reflective film, and a diffuser (none of which is shown). When the edge light system is adopted, the backlight unit 300 can further include a light guide plate and a light reflector (none of which is shown).

The liquid crystal cell 200 includes a pair of substrates 210 and 210' and a liquid crystal layer 220 as a display medium sandwiched between the substrates. In a general configuration, on the substrate 210' as one in the pair, a color filter and a black matrix are provided, and on the substrate 210 as the other in pair, there are provided switching elements for controlling electro-optical property of the liquid crystal, scanning lines for giving gate signals to the switching elements and signal lines for giving source signals thereto, and pixel electrodes and counter electrodes. An interval (cell gap) between the above-mentioned substrates 210 and 210' can be controlled by spacers and the like. On sides of the above-mentioned substrates 210 and 210', which are brought into contact with the liquid crystal layer 220, for example, alignment films made of polyimide or the like can be provided.

In one embodiment, the liquid crystal layer 220 includes liquid crystal molecules aligned in a homogeneous alignment in a state where an electric field is not present. The liquid crystal layer (liquid crystal cell as a result) as described above typically exhibits a three-dimensional refractive index of nx>ny=nz. Note that, in this specification, ny=nz includes not only a case where ny and nz are completely the same, but also a case where ny and nz are substantially the same.

As a typical example of a drive mode using the liquid crystal layer that exhibits the three-dimensional refractive index as described above, the in-plane switching (IPS) mode, the fringe field switching (FFS) mode, and the like are given. In the above-mentioned IPS mode, by using the electrically controlled birefringence (ECB) effect, the liquid crystal molecules aligned in the homogeneous alignment in the state where an electric field is not present are allowed to respond, for example, to an electric field (also referred to as a horizontal electric field), which is generated by the counter electrode and pixel electrode, each being formed of metal, and is parallel to the substrates. More specifically, for example, as described in "Monthly Display, July" pp. 83 to 88 (1997), published by Techno Times Co., Ltd. and "Ekisho vol. 2, No. 4" pp. 303 to 316 (1998), published by The Japanese Liquid Crystal Society, when an alignment direction of the liquid crystal cell at the time when no electric field is applied thereto and an absorption axis of a polarizer on one side are allowed to coincide with each other, and the upper and lower polarizing plates are arranged perpendicularly to each other, the normally black mode provides completely black display in the state where no electric field is present. When the electric field is present, the liquid crystal molecules perform a rotation operation while remaining parallel to the substrates so that a transmittance corresponding to a rotation angle can be obtained. Note that, the above-mentioned IPS mode includes the super in-plane switching (S-IPS) mode and the advanced super in-plane switching (AS-IPS) mode, each of which employs a V-shaped electrode, a zigzag electrode, or the like.

In the above-mentioned FFS mode, by using the electrically controlled birefringence effect, the liquid crystal molecules aligned in the homogeneous alignment in the state where no electric field is present are allowed to respond, for example, to an electric field (also referred to as a horizontal electric field), which is generated by the counter electrode and pixel electrode, each being formed of a transparent conductor, and is parallel to the substrates. Note that, the horizontal electric field in the FFS mode is also referred to as a fringe electric field. This fringe electric field can be generated by setting an interval between the counter electrode and the pixel electrode, each of which is formed of the transparent conductor, narrower than the cell gap. More specifically, for example, as described in "SID (Society for Information Display) 2001 Digest, pp. 484 to 487" and JP 2002-031812 A, when an alignment direction of the liquid crystal cell at the time when no electric field is applied thereto and an absorption axis of a polarizer on one side are allowed to coincide with each other, and the upper and lower polarizing plates are arranged perpendicularly to each other, the normally black mode provides completely black display in the state where no electric field is present. When the electric field is present, the liquid crystal molecules perform a rotation operation while remaining parallel to the substrates so that a transmittance corresponding to a rotation angle can be obtained. Note that, the above-mentioned FFS mode includes the advanced fringe field switching (A-FFS) mode and the ultra fringe field switching (U-FFS) mode, each of which employs a V-shaped electrode, a zigzag electrode, or the like.

In the drive mode (for example, the IPS mode, the FFS mode) using the liquid crystal molecules aligned in the homogeneous alignment in the state where no electric field is present, there is no oblique gray-scale inversion, and an oblique viewing angle thereof is wide, and accordingly, there is an advantage in that visibility in an oblique direction is excellent even when the surface light source directed in the front direction, which is used in the present invention, is used.

In another embodiment, the liquid crystal layer 220 includes liquid crystal molecules aligned in a homeotropic alignment in the state where no electric field is present. The liquid crystal layer (liquid crystal cell as a result) as described above typically exhibits a three-dimensional refractive index of nz>nx=ny. As a drive mode using the liquid crystal molecules aligned in the homeotropic alignment in the state where no electric field is present, for example, the vertical alignment (VA) mode is given. The VA mode includes the multi-domain VA (MVA) mode.

Figure 5A:
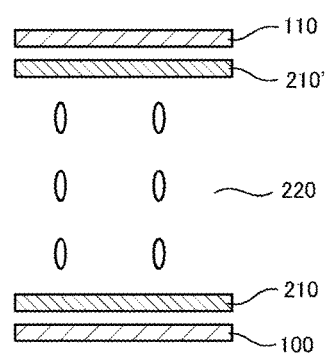
FIGS. 5(a) and 5(b) are each a schematic sectional view illustrating the aligned state of a liquid crystal molecule in a VA mode.
Figure 5B:
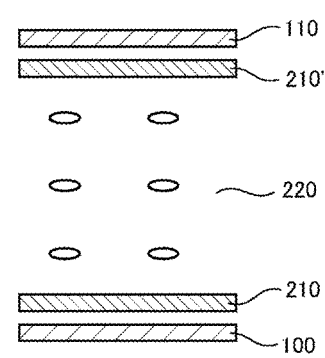

FIGS. 5(a) and 5(a) are schematic sectional views illustrating aligned states of the liquid crystal molecules in the VA mode. As illustrated in FIG. 5(a), the liquid crystal molecules in the VA mode are aligned, at the time when no voltage is applied thereto, approximately vertically (normal direction) on the substrates 210 and 210'. Here, the term "approximately vertical" also includes a case where an alignment vector of the liquid crystal molecules is inclined with respect to the normal direction, that is, a case where the liquid crystal molecules have a tilt angle. The tilt angle (angle from the normal line) is preferably 10° or less, more preferably 5° or less, particularly preferably 1° or less. The liquid crystal molecules have the tilt angle in such a range so that the liquid crystal display apparatus can be excellent in contrast. Moreover, moving picture display characteristics can be enhanced. The approximately vertical alignment as described above can be realized, for example, by arranging nematic liquid crystal, which has negative dielectric anisotropy, between substrates on which vertical alignment films are formed. In such a state, light of linearly polarized light, which passes through the optical member 100 and enters the liquid crystal layer 220, travels along a direction of a major axis of the liquid crystal molecules aligned approximately vertically. The birefringence is not generated substantially in a major axis direction of the liquid crystal molecules, and accordingly, the incident light travels without changing a polarization direction thereof, and is absorbed by the viewer side polarizing plate 110 having a transmission axis perpendicular to the optical member 100. In this manner, display of a dark state is obtained at the time when no voltage is applied (normally black mode). As illustrated in FIG. 5(b), when a voltage is applied between the electrodes, the major axis of the liquid crystal molecules is aligned parallel to the substrate surfaces. The liquid crystal molecules in this state exhibit the birefringence to the light of the linearly polarized light, which passes through the optical member 100 and enters the liquid crystal layer, and the polarization state of the incident light is changed in response to an inclination of the liquid crystal molecules. The light that passes through the liquid crystal layer 220 at a time when a predetermined maximum voltage is applied becomes, for example, linearly polarized light in which a polarization direction is rotated by 90°, and accordingly, the light transmits through the viewer side polarizing plate 110, and display of a bright state is obtained. When the state where no voltage is applied is set again, the display can be returned to the display of the dark state by alignment regulating force. Moreover, the inclination of the liquid crystal molecules is controlled by changing the applied voltage, and transmission intensity of the light from the viewer side polarizing plate 110 is changed so that gray-scale display becomes possible.

EXAMPLES

The present invention is specifically described below by way of examples, but the present invention is not limited to these examples. Testing and evaluating methods in the examples are as follows. Moreover, unless particularly specified, "parts" and "%" in the examples are weight-based units.

(1) Reflectance of Reflective Polarizer

A reflective polarizer was sandwiched between two 45° right-angle prisms (BK-7) manufactured by SIGMAKOKI CO., LTD., and its integration transmittance was measured with a spectrophotometer (manufactured by Hitachi Keisokuki, trade name: "U-4100"). At this time, a polarizer was arranged on an incident light source side so that incident light became linearly polarized light, and the reflective polarizer sandwiched between the prisms was arranged so that the polarization direction of the light coincided with the transmission axis direction of the reflective polarizer. In the measurement, the direction of the linearly polarized light entering the reflective polarizer coincides with a direction tilted from the normal of the surface of the reflective polarizer by 45° along a direction perpendicular to the direction in which a side light is arranged. Next, a transmittance T(650) at 650 nm obtained by the measurement was applied to the following equation and the resultant value was defined as a reflectance R(650) for light having a wavelength of 650 nm entering the reflective polarizer at 45°.

$$R(650)=(100-T(650))\times 1.09$$

Here, the numerical value "1.09" is a coefficient for correcting a measured value in consideration of twice the interfacial reflection resulting from a difference between the refractive index of each prism used this time (n=1.52) and the refractive index of air (n=1).

(2) Integrated Illuminance of Liquid Crystal Display Apparatus

The integrated illuminance of a liquid crystal display apparatus was calculated by: causing the liquid crystal display apparatus to display a white color on its entire screen; measuring its brightnesses in all azimuths at polar angles of from 0° to 80° with a conoscope manufactured by Autronic-Melchers GmbH; and integrating the measured values over an angle.

Example 1

(Production of Film for First Retardation Layer)

A commercially available polymer film [manufactured by Optes Inc., trade name: "ZeonorFilm ZF14-130 (thickness: 60 μm, glass transition temperature: 136° C.)"] whose main component was a cyclic polyolefin-based polymer was subjected to fixed-end uniaxial stretching in its width direction with a tenter stretching machine at a temperature of 158° C. in such a manner that its film width was 3.0 times as large as the original film width (lateral stretching step). The resultant film was a negative biaxial plate (three-dimensional refractive index: nx>ny>nz) having a fast axis in the conveying direction. The negative biaxial plate had an in-plane retardation of 118 nm and an Nz coefficient of 1.16.

(Production of Film for Second Retardation Layer)

A pellet-shaped resin of a styrene-maleic anhydride copolymer (manufactured by Nova Chemicals Japan Ltd., product name: "DYLARK D232") was extruded with a single screw extruder and a T die at 270° C., and the resultant sheet-shaped molten resin was cooled with a cooling drum to obtain a film having a thickness of 100 μm. The film was subjected to free-end uniaxial stretching in the conveying direction with a roll stretching machine at a temperature of 130° C. and a stretching ratio of 1.5 times to obtain a retardation film having a fast axis in the conveying direction (longitudinal stretching step). The resultant film was subjected to fixed-end uniaxial stretching in its width direction with a tenter stretching machine at a temperature of 135° C. in such a manner that its film width was 1.2 times as large as the film width after the longitudinal stretching, thereby obtaining a biaxially stretched film having a thickness of 50 μm (lateral stretching step). The resultant film was a positive biaxial plate (three-dimensional refractive index: nz>nx>ny) having a fast axis in the conveying direction. The positive biaxial plate had an in-plane retardation of 20 nm and a thickness direction retardation Rth of −80 nm.

(Production of Polarizing Plate with Retardation Layers)

A polymer film containing polyvinyl alcohol as a main component [manufactured by KURARAY CO., LTD., trade name "9P75R (thickness: 75 μm, average polymerization degree: 2,400, saponification degree: 99.9 mol %)"] was stretched in its conveying direction at a ratio of 1.2 times while being immersed in a water bath for 1 minute. After that, the film was stretched at a ratio of 3 times with reference to a film (original length), which had not been stretched at all, in the conveying direction while being dyed by being immersed in an aqueous solution having an iodine concentration of 0.3 wt % for 1 minute. Next, the stretched film was further stretched at a ratio of up to 6 times with reference to the original length in the conveying direction while being immersed in an aqueous solution having a boric acid concentration of 4 wt % and a potassium iodide concentration of 5 wt %. The resultant was dried at 70° C. for 2 minutes to obtain a polarizer.

Meanwhile, an alumina colloid-containing adhesive was applied to one surface of a triacetylcellulose (TAC) film (manufactured by KONICA MINOLTA, INC., product name "KC4UW," thickness: 40 μm), and the resultant was laminated on one surface of the polarizer obtained in the foregoing by a roll-to-roll process so that the conveying directions of both the polarizer and the film were parallel to each other. It should be noted that the alumina colloid-containing adhesive was prepared by: dissolving 50 parts by weight of methylol melamine with respect to 100 parts by weight of a polyvinyl alcohol-based resin having an acetoacetyl group (average polymerization degree: 1,200, saponification degree: 98.5 mol %, acetoacetylation degree: 5 mol %) in pure water to prepare an aqueous solution having a solid content of 3.7 wt %; and adding 18 parts by weight of an aqueous solution containing an alumina colloid having a positive charge (average particle diameter: 15 nm) at a solid content of 10 wt % to 100 parts by weight of the resultant aqueous solution. Subsequently, a film for a first retardation layer having applied thereto the alumina colloid-containing adhesive was laminated on a surface of the polarizer opposite to the TAC film by the roll-to-roll process so that their conveying directions were parallel to each other. After that, the laminate was dried at 55° C. for 6 minutes. A film for a second retardation layer was laminated on the surface of the first retardation layer of the laminate after the drying through an acrylic pressure-sensitive adhesive (thickness: 5 μm) by the roll-to-roll process so that their conveying directions were parallel to each other. Thus, a polarizing plate with retardation layers (second retardation layer/first retardation layer/polarizer/TAC film) was obtained.

(Prism Sheet)

A commercial notebook personal computer (manufactured by Sony Corporation, trade name: "VAIO Type S") was dismantled to remove a prism sheet on a backlight side, and a diffusion layer present on a surface opposite to a prism portion was removed with ethyl acetate. Thus, a prism sheet having no diffusion layer was prepared as a prism sheet of this example.

(Production of Optical Member)

The polarizing plate with the retardation layers obtained in the foregoing and a reflective polarizer removed from a backlight member obtained by dismantling a 40-inch television manufactured by Sharp Corporation (product name: AQUOS, item's stock number: LC40-Z5) were bonded onto each other through an acrylic pressure-sensitive adhesive. It should be noted that both surfaces of the reflective polarizer were provided with diffusion layers and hence the diffusion layers were removed before the polarizer was used. The polarizing plate integrated with the reflective polarizer and the reverse prism sheet obtained in the foregoing were bonded onto each other through an acrylic pressure-sensitive adhesive (23 µm) to provide an optical member having such a construction "polarizing plate/light diffusion layer (light-diffusing pressure-sensitive adhesive layer)/reflective polarizer/prism sheet" as illustrated in FIG. 1. It should be noted that the polarizing plate and the reverse prism sheet were integrated with each other so that the ridge line direction of each unit prism of the prism sheet and the transmission axis of the polarizing plate were parallel to each other, and the transmission axis of the polarizing plate and the transmission axis of the reflective polarizer were parallel to each other. Therefore, the integration was performed so that the ridge line direction of each unit prism of the prism sheet and the reflection axis of the reflective polarizer were perpendicular to each other. The reflectance R(650) for light having a wavelength of 650 nm entering the reflective polarizer at 45° was measured in such arrangement relationship. As a result, the R(650) was 81%.

(Production of Liquid Crystal Display Apparatus Using Optical Member of the Present Invention)

A liquid crystal di splay panel was removed from a liquid crystal display apparatus of the IPS mode (manufactured by Apple Inc., trade name: "iPad2"), and an optical member such as a polarizing plate was removed from the liquid crystal display panel to take out a liquid crystal cell. Both surfaces (outside of each glass substrate) of the liquid crystal cell were cleaned for use. A commercial polarizing plate (manufactured by Nitto Denko Corporation, product name: "CVT1764FCUHC") was bonded onto the upper side (viewer side) of the liquid crystal cell. Further, in order to improve visibility in viewing the liquid crystal display apparatus while wearing polarizing sunglasses, a λ/4 plate (manufactured by Kaneka Corporation, trade name: "UTZ film #140") was bonded onto the polarizing plate in such a manner that its slow axis formed an angle of 45° with respect to the absorption axis of the polarizing plate. Further, the optical member obtained in the foregoing was bonded as a lower side (back surface side) polarizing plate to the lower side (back surface side) of the liquid crystal cell through an acrylic pressure-sensitive adhesive. Thus, a liquid crystal display panel was obtained. At this time, the bonding was performed so that the transmission axes of the respective polarizing plates were perpendicular to each other.

Meanwhile, a backlight unit removed from the commercial notebook personal computer (manufactured by Sony Corporation, trade name: "VAIO Type S") was used as a backlight unit. The backlight unit was incorporated into the liquid crystal display panel obtained in the foregoing. Thus, such a liquid crystal display apparatus as illustrated in FIG. 4 was produced.

(Production of Liquid Crystal Display Apparatus in which Prism Sheet is Separately Arranged)

A liquid crystal display apparatus was produced in the same manner as in the foregoing except that the reverse prism sheet was incorporated into the backlight unit and provided as a member separate from the polarizing plate integrated with the reflective polarizer.

(Evaluation)

The integrated illuminance of the liquid crystal display apparatus using the optical member of the present invention was measured. Further, the integrated illuminance of the liquid crystal display apparatus in which the prism sheet was separately arranged was measured, and the ratio of the integrated illuminance of the liquid crystal display apparatus using the optical member of the present invention to the integrated illuminance of the liquid crystal display apparatus in which the prism sheet was separately arranged was calculated. Table 1 shows the results.

Example 2

A liquid crystal display apparatus using the optical member of the present invention and a liquid crystal display apparatus in which the prism sheet was separately arranged were each produced in the same manner as in Example 1 except that the ridge line direction of each unit prism of the prism sheet and the reflection axis of the reflective polarizer were made parallel to each other. The reflectance R(650) for light having a wavelength of 650 nm entering the reflective polarizer at 45° was measured in such arrangement relationship. As a result, the R(650) was 94%. The same evaluation as that of Example 1 was performed by using each liquid crystal display apparatus. Table 1 shows the results.

Example 3

A liquid crystal monomer (manufactured by BASF, trade name: "LC-1057") and a chiral agent (manufactured by BASF, trade name: "LC-756") were dissolved at a mixing ratio of 92.4:7.6 in a solvent CPN so that a solution to be obtained had a concentration of 30 wt %. An initiator (manufactured by BASF, trade name: "IRGACURE 907") was added to the mixed solution at a ratio of 3 parts by weight with respect to 100 parts by weight of the mixed liquid crystal. Thus, an application liquid was prepared. The application liquid was applied onto a base material film (manufactured by Toray Industries, Inc., trade name: "LUMIRROR T-60") with a wire bar #16, dried for 2 minutes at 120° C., and irradiated with UV light at 300 mJ/cm$^2$. Thus, a film having a cholesteric liquid crystal layer (A) was obtained. An application liquid containing the LC-1057 and the LC-756 at a mixing ratio of 93.9:6.1 was produced on the liquid crystal layer (A), and a liquid crystal layer (B) was produced on the liquid crystal layer (A) by the same procedure. A liquid (C) containing the LC-1057 and the LC-756 at a mixing ratio of 95.0:5.0, a liquid (D) containing the LC-1057 and the LC-756 at a mixing ratio of 95.7:4.3, and a liquid (E) containing the LC-1057 and the LC-756 at a mixing ratio of 96.2:3.8 were similarly produced. Thus, a film having the liquid crystal layers (A) to (E) was obtained. The resultant cholesteric liquid crystal film and a λ/4 plate (manufactured by KANEKA CORPORA- TION, trade name: "UTZ-Film #140") were combined with each other to provide a circularly polarized light separation-type reflective polarizer. A liquid crystal display apparatus using the optical member of the present invention and a liquid crystal display apparatus in which the prism sheet was separately arranged were each produced in the same manner as in Example 2 except that the thus-obtained circularly polarized light separation-type reflective polarizer was used. The reflectance R(650) for light having a wavelength of 650 nm entering the reflective polarizer at 45° was measured in such arrangement relationship. As a result, the R(650) was 83%. The same evaluation as that of Example 1 was performed by using each liquid crystal display apparatus. Table 1 shows the results.

Example 4

Such polarizing fibers that a difference in refractive index in a direction perpendicular to a lengthwise direction between the polarizing fibers was small and a difference in refractive index in the lengthwise direction between the polarizing fibers was large were produced in accordance with the procedure described in Example 1 of JP 2009-24318 A, and a polarizing woven fabric was produced by using the polarizing fibers. A liquid crystal display apparatus using the optical member of the present invention and a liquid crystal display apparatus in which the prism sheet was separately arranged were each produced in the same manner as in Example 1 except that the polarizing woven fabric was used as a reflective polarizer. The reflectance R(650) for light having a wavelength of 650 nm entering the reflective polarizer at 45° was measured in such arrangement relationship. As a result, the R(650) was 91%. The same evaluation as that of Example 1 was performed by using each liquid crystal display apparatus. Table 1 shows the results.

Comparative Example 1

A liquid crystal display apparatus using the optical member of the present invention and a liquid crystal display apparatus in which the prism sheet was separately arranged were each produced in the same manner as in Example 1 except that: a reflective polarizer having a similar structure to that of the reflective polarizer used in Example 1 was used; and the ridge line direction of each unit prism of the prism sheet and the reflection axis of the reflective polarizer were made parallel to each other. The reflectance R(650) for light having a wavelength of 650 nm entering the reflective polarizer at 45° was measured in such arrangement relationship. As a result, the R(650) was 66%. The same evaluation as that of Example 1 was performed by using each liquid crystal display apparatus. Table 1 shows the results.

Comparative Example 2

A reflective polarizer was produced in the same manner as in Example 3 except that the liquid crystal layer (E) was not formed and a cholesteric liquid crystal film having the layers (A) to (D) was used. A liquid crystal display apparatus using the optical member of the present invention and a liquid crystal display apparatus in which the prism sheet was separately arranged were each produced in the same manner as in Example 3 except that the thus-obtained reflective polarizer was used. The reflectance R(650) for light having a wavelength of 650 nm entering the reflective polarizer at 45° was measured in such arrangement relationship. As a result, the R(650) was 27%. The same evaluation as that of Example 1 was performed by using each liquid crystal display apparatus. Table 1 shows the results.

TABLE 1

| | Reflectance R (650) (%) | Integrated illuminance (lx) | | Integrated/separately arranged ratio (%) |
| --- | --- | --- | --- | --- |
| | | Separately arranged | Integrated | |
| Example 1 | 81 | 356 | 295 | 83 |
| Example 2 | 94 | 349 | 316 | 91 |
| Example 3 | 83 | 364 | 317 | 87 |
| Example 4 | 91 | 249 | 225 | 90 |
| Comparative Example 1 | 66 | 371 | 295 | 79 |
| Comparative Example 2 | 27 | 355 | 266 | 75 |

As is apparent from Table 1, a liquid crystal display apparatus using the optical member of each of Examples of the present invention as a back surface side polarizing plate can suppress a reduction in illuminance of the liquid crystal display apparatus as compared with the case where a polarizing plate and a prism sheet are used while being separately arranged.

INDUSTRIAL APPLICABILITY

The optical member according to an embodiment of the present invention can be suitably used as a back surface side polarizing plate for a liquid crystal display apparatus. The liquid crystal display apparatus using such optical member can be used for various applications such as portable devices including a personal digital assistant (PDA), a cellular phone, a watch, a digital camera, and a portable gaming machine, OA devices including a personal computer monitor, a notebook-type personal computer, and a copying machine, electric home appliances including a video camera, a liquid crystal television set, and a microwave oven, on-board devices including a reverse monitor, a monitor for a car navigation system, and a car audio, exhibition devices including an information monitor for a commercial store, security devices including a surveillance monitor, and caring/medical devices including a caring monitor and a medical monitor.

REFERENCE SIGNS LIST 10 polarizing plate
11 polarizer
12 protective layer
13 protective layer
20 reflective polarizer
30 prism sheet
31 base portion
32 prism portion
100 optical member

The invention claimed is:
1. An optical member, comprising:
a polarizing plate,
a reflective polarizer, and
a prism sheet in the stated order,
wherein the reflective polarizer is of a linearly polarized light separation type,
wherein the reflective polarizer is a multilayer laminate obtained by alternately laminating a first layer having birefringence and a second layer substantially free of birefringence, and wherein the reflective polarizer has a reflectance of 70% or more for linearly polarized light that has a polarization direction which coincides with the transmission axis of the reflective polarizer and has a wavelength of 650 nm entering the reflective polarizer at 45°.

2. The optical member according to claim 1, wherein the prism sheet comprises an array of a plurality of columnar unit prisms that are convex toward a side opposite to the reflective polarizer.

3. The optical member according to claim 2, wherein a reflection axis direction of the reflective polarizer and a ridge line direction of each of the unit prisms of the prism sheet are parallel to each other.

4. The optical member according to claim 2, wherein a reflection axis direction of the reflective polarizer and a ridge line direction of each of the unit prisms of the prism sheet are perpendicular to each other.

5. The optical member according to claim 1,
wherein the reflective polarizer has a reflectance of 70% or more for the linearly polarized light that has a polarization direction parallel to the transmission axis of the reflective polarizer and has a wavelength of 450 nm entering the reflective polarizer at 45°, and
wherein the reflective polarizer has a reflectance of 70% or more for the linearly polarized light that has a polarization direction parallel to the transmission axis of the reflective polarizer and has a wavelength of 550 nm entering the reflective polarizer at 45°.

6. The optical member according to claim 1, wherein the reflective polarizer has a reflectance of 80% or more for the linearly polarized light that has a polarization direction parallel to the transmission axis of the reflective polarizer and has a wavelength of 650 nm entering the reflective polarizer at 45°.

7. A polarizing plate set, comprising:
the optical member according to claim 1 to be used as a back surface side polarizing plate; and
a viewer side polarizing plate.

8. A liquid crystal display apparatus, comprising:
a liquid crystal cell;
a polarizing plate arranged on a viewer side of the liquid crystal cell; and
the optical member according to claim 1 arranged on a side of the liquid crystal cell opposite to the viewer side.

9. The optical member according to claim 1, wherein the reflective polarizer has a reflectance of 90% or more for the linearly polarized light that has a polarization direction parallel to the transmission axis of the reflective polarizer and has a wavelength of 650 nm entering the reflective polarizer at 45°.

10. The optical member according to claim 1, wherein the reflective polarizer has a reflectance of 70% or more for the linearly polarized light that has a polarization direction parallel to the transmission axis of the reflective polarizer and has a wavelength of 550 nm±50 nm entering the reflective polarizer at 45°.

11. The optical member according to claim 1, wherein the reflective polarizer has a reflectance of 70% or more for the linearly polarized light that has a polarization direction parallel to the transmission axis of the reflective polarizer and has a wavelength of 550 nm±100 nm entering the reflective polarizer at 45°.

12. The optical member according to claim 1, wherein the polarizing plate, the reflective polarizer and the prism sheet are integrated.

* * * * *